Figure 1:
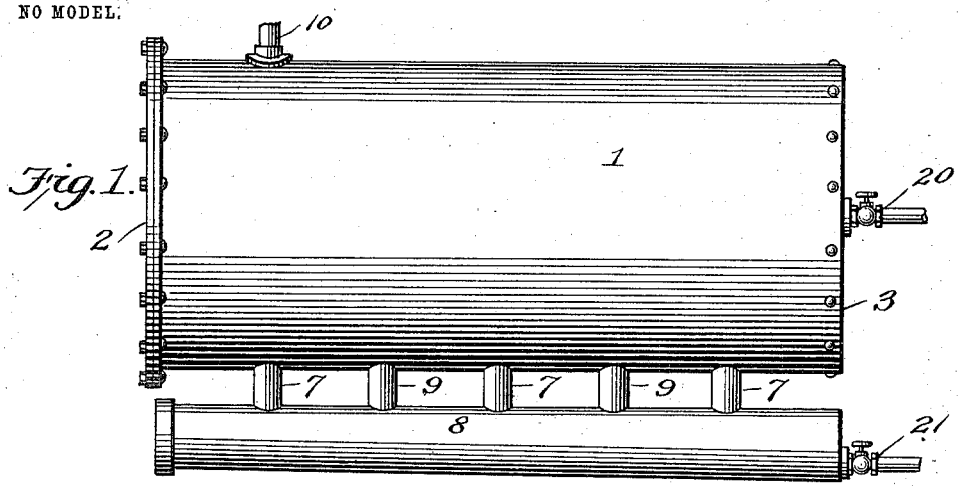

No. 719,319. PATENTED JAN. 27, 1903.
J. C. FORBES & N. WEBER.
WATER PURIFIER AND HEATER.
APPLICATION FILED JUNE 17, 1902.
NO MODEL.

Witnesses
Geo. Ackman.
B. L. Dunk.

Inventors
Joseph C. Forbes
Nicholas Weber
By Victor J. Evans
Attorney

THE NORRIS PETERS CO., PHOTO-LITHO., WASHINGTON, D. C.

UNITED STATES PATENT OFFICE.

JOSEPH C. FORBES AND NICHOLAS WEBER, OF CHICAGO, ILLINOIS.

WATER PURIFIER AND HEATER.

SPECIFICATION forming part of Letters Patent No. 719,319, dated January 27, 1903.

Application filed June 17, 1902. Serial No. 112,075. (No model.)

*To all whom it may concern:*

Be it known that we, JOSEPH C. FORBES and NICHOLAS WEBER, citizens of the United States, residing at Chicago, in the county of Cook and State of Illinois, have invented new and useful Improvements in Water Purifiers and Heaters, of which the following is a specification.

This invention relates to a water-purifier which is adapted to be used as a steam-purifier or exhaust-heater, and though the improved device is capable of a general application it is particularly intended for use with steam-boilers and the like for removing the mud, lime, and scale forming substances usually held in solution in feed-water and also to receive exhaust-steam and set up a condensation and precipitation of the impurities carried by the water of condensation and also to simultaneously heat the latter sufficiently for practical reintroduction into a boiler in a pure state.

The primary object of the invention is to provide a simple and effective organization of contributing devices or elements, whereby water introduced into the purifier will be purified by a step-by-step operation and caused to flow from one compartment into another throughout a specified series until it reaches the last of the latter in a pure state and from which it may be conveyed back to a boiler or drawn off for any other use, the accumulations of sediment or other impurities at the bottoms of the compartments or pans being continually caused to settle into a mud-drum or analogous receptacle below the planes of the said bottoms.

A further object of the invention is to provide a purifier having a series of precipitating compartments or pans therein with divisional elements so constructed that the circulation of the water and passage of the latter from one compartment into another will be effected alternately at a low and higher elevation, and thus remove all liability of conveyance of the sediment from one compartment or pan by agitation to the next and thereby cause the water flowing into the last compartment or pan of the series to be practically pure.

A further object of the invention is to heat the purified water for some uses during the purifying operation and to embody, in combination with a series of purifying compartments or pans separated by partitions, a series of oppositely-inclined plates or shelves, over which the water entering the purifier is caused to flow in a thin sheet and to pass into the first compartment or pan of the series in this condition with material advantage in liberating sediment or other impurities carried by the water when simply purifying the latter, and also in heating the water more effectively by the introduction of exhaust-steam or the application of other caloric means.

With these and other objects in view the invention consists in the arrangement of the several parts, which will be more fully hereinafter described and claimed.

Figure 2:
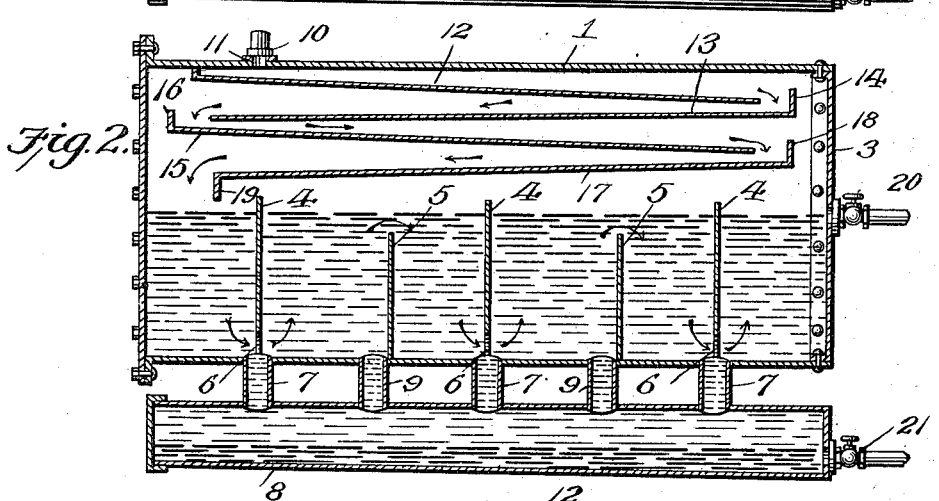
Figure 3:
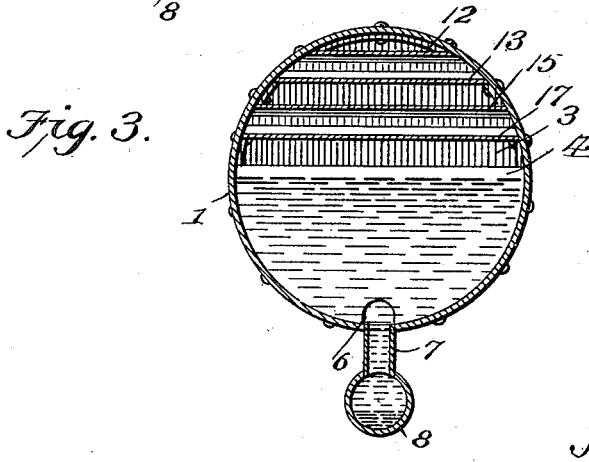

In the drawings, Figure 1 is a side elevation of a purifier and heater embodying the principles of the invention. Fig. 2 is a central longitudinal vertical section of the same. Fig. 3 is a transverse vertical section.

Similar numerals of reference are employed to indicate corresponding parts in the several views.

The numeral 1 designates a cylindrical body or shell, having opposite heads 2 and 3 firmly bolted to the opposite ends of the body or shell. At regularly-spaced intervals in the lower portion of the body or shell are partitions 4 and 5, which extend transversely of the interior of said body or shell, the partitions 4 being substantially semicircular in contour and extending about half-way upwardly through the interior of the body or shell and the partitions 5 of less vertical extent. The partitions 4 have openings 6 at the center of the bottom portions, and the partitions 5 are imperforate, the partitions 4 being disposed over vertical tubular unions 7, secured at their lower ends to the upper portion of a mud-drum 8. Other tubular unions 9 similar to the unions 7 also connect with the upper portion of the drum 8 and with the lower portion of the body or shell 1 slightly in advance of the lower central portions of the partitions 5.

To the top portion of the body or shell 1, adjacent to the head 2, an inlet 10 is provided, which may be a pipe running from any suitable distance or source of supply and coinciding or communicating with an inlet-opening 11. Directly under the inlet 11 is a plate or shelf 12, which inclines downwardly toward the head 3, and the free end thereof is disposed over a plate 13, having an upwardly-projecting angular guard 14, the said plate 13 inclining downwardly in a reverse direction toward the head 2. The plate or shelf 13 has its free end disposed over the upper portion of a plate or shelf 15, with an upstanding terminal guard 16 similar to the guard of plate 13, and said plate 15 inclines in a plane parallel with the plate 12 and has its free end disposed over the upper extremity of a lowermost plate or shelf 17, which is in like manner parallel to the plate or shelf 13 and at its uppermost end has an upstanding guard 18 and at its lowermost end a depending guard 19, over which the water is directed into the first compartment formed between the head 2 and the partition 4, the said guard 19 preventing the water from dashing under the plate 17 and being thrown over the upper terminal or edge of the said first partition 4.

Secured to the head 3 at an elevation slightly below the plane of the upper edge of the adjacent partition 4 is a valved outlet connection 20, which may extend away from the purifier any suitable distance and may obviously be replaced by any ordinary form of drawer or cock. Under known conditions and during the operation of the purifier the valve in the connection 20 will be open, so as to permit the water flowing into the last compartment or pan in its highly-purified condition to run off proportionately to the inflow. The one end of the mud-drum or sediment-receptacle 8 also has a valved outlet 21 for the purpose of relieving the said drum or receptacle of the material which accumulates therein, the said outlet connection 21 being low enough to practically relieve the drum or receptacle of the accumulation therein.

In the operation of the device the water or water and steam to be purified is permitted to pass into the body or shell 1 through the inlet connection or device 10 and successively flow downwardly over the plates or shelves 12, 13, 15, and 17, and finally enter the first compartment or pan between the head 2 and the adjacent partition 4. From this first compartment or pan, after being relieved of a portion of its sediment and impurities, the water flows through the opening 6 at the bottom of the first partition into the second compartment and upwardly over the second partition 5, and then downwardly through the opening 6 in the third partition 4, and so on in relation to the successive partitions until it reaches the last compartment or pan, when it will be in a practically pure condition and ready for feed-water purposes or other uses, as may be desired. The sediment or impurities which collect or accumulate in the lower portions of the compartments or pans are caused to pass downwardly through the unions 7 and 9 into the mud-drum and from the latter drawn off, as heretofore set forth. It will be observed that the unions 7 are disposed directly below the openings 6 in the partitions 4, and the advantage of this arrangement is that a forceful current will be set up through the said openings, and thereby draw the sediment and impurities which collect in the adjacent compartments toward the said unions and direct them downwardly therethrough into the mud-drum. The disposition of the unions 9 adjacent to the partitions 5 is also effective in view of the fact that the forwardly-moving water in its circulation will push or impel the sediment or impurities in the compartments or pans, of which the front partitions 5 form the front walls, toward the said partitions 5 and meeting the obstructions set up by the partitions 5 will be deflected downwardly through the said unions 9. If exhaust or live steam be introduced through the inlet simultaneously with the water to be purified, the latter will become heated, particularly in view of the thin sheet thereof passing over the several plates or shelves, and when the water under this treatment arrives at the last compartment or pan of the series it is in proper condition to be conveyed back to the boiler, as will be readily understood.

The improved purifier and heater is simple and effective in its construction and operation and can be manufactured at a comparatively small cost. The number of compartments or pans may be changed at will and likewise the plates or shelves, and, furthermore, the proportions, dimensions, and minor details of construction may be modified to vary the capacity of the purifier and adapt it for different applications without departing from the principle of the invention.

Having thus described the invention, what is claimed as new is—

1. In a device of the class set forth, the combination of a hollow body with closed ends and having an upper inlet near one end and an outlet at an elevation in the opposite end, a series of compartments in the lower portion of the said body separated by partitions alternately varying in vertical elevation, the extended vertical partitions having lower central openings and the shorter partitions being imperforate, a mud-drum connected to the lower portion of the body, and a series of reversely-inclined plates disposed above the partitions.

2. In a device of the class set forth, the combination of a cylindrical body having opposite closed ends, and an upper inlet and an outlet at one end, a series of compartments in the lower portion of the body separated by partitions varying in vertical extent, the partitions having the greater vertical extent being provided with lower openings and the shorter partitions being imperforate, whereby the water will be caused to flow through the lower portion of one partition and over the top of the next partition throughout the series of compartments, and means for relieving the compartments of accumulations of sediment and impurities.

3. In a device of the class set forth, the combination of a hollow body having an inlet at the upper portion near one end and an outlet at a suitable elevation in the opposite end, upper conveying means within the body, lower compartments having divisional means varying alternately in vertical extent, the water flowing through the lower portion of the divisional means having the greatest vertical extent and over the upper edges of the shorter divisional means throughout the series of compartments, and a mud-drum having tubular connections which are attached to the bottom portion of the body close to the said divisional means.

4. In a device of the class set forth, the combination of a hollow body having opposite closed ends, an upper inlet near one end and an outlet in the opposite end, oppositely-inclined conveying devices within the upper portion of the body, a series of successive compartments in the lower portion of the body separated by divisional compartments alternately varying in vertical extent, each of the partitions having the greater vertical extent being formed with an opening in the center of the lower portion thereof and the shorter partitions being imperforate whereby the water will be caused to flow through the lower portions of the partitions having the greater vertical extent and over the upper edges of the shorter partitions, and a mud-drum having tubular unions attached to the lower portion of the body, a portion of said unions being directly under the partitions having the openings therein and the remaining portions of said unions arranged close to and in advance of the shorter partitions.

In testimony whereof we affix our signatures in presence of two witnesses.

JOSEPH C. FORBES.
NICHOLAS WEBER.

Witnesses:
FRED WM. ENTING,
JOHN FODEY.